United States Patent
Landwehr et al.

(10) Patent No.: US 7,055,738 B2
(45) Date of Patent: Jun. 6, 2006

(54) DEVICE FOR ACCEPTING BANKNOTES

(75) Inventors: Martin Landwehr, Paderborn (DE); Heinz Ademmer, Geseke (DE); Rainer Becker, Mandelbachtal (DE); Norbert Both, Tholey (DE); Ifrit Kiselmann, Bliekastel (DE); Christoph Rodner, Sulzbach (DE); Andriy Yashan, Saarbrücken (DE)

(73) Assignee: Wincor Nixdorf International GmbH, Paderborn (DE)

( * ) Notice: Subject to any disclaimer, the term of this patent is extended or adjusted under 35 U.S.C. 154(b) by 15 days.

(21) Appl. No.: 10/467,197

(22) PCT Filed: Jan. 28, 2002

(86) PCT No.: PCT/EP02/00866

§ 371 (c)(1),
(2), (4) Date: Feb. 17, 2004

(87) PCT Pub. No.: WO02/063572

PCT Pub. Date: Aug. 15, 2002

(65) Prior Publication Data

US 2004/0129771 A1    Jul. 8, 2004

(30) Foreign Application Priority Data

Feb. 5, 2001   (DE) ................... 101 05 082

(51) Int. Cl.
*G06F 17/60* (2006.01)
(52) U.S. Cl. .................... 235/379; 705/43
(58) Field of Classification Search ............... 235/379, 235/381, 439, 440, 441, 449, 450; 705/43; 324/225, 232, 233, 236, 239–243
See application file for complete search history.

(56) References Cited

U.S. PATENT DOCUMENTS

| 3,758,849 | A | * | 9/1973 | Susman et al. ............. 324/225 |
| 4,331,919 | A | * | 5/1982 | Beckley ...................... 324/240 |
| 4,536,709 | A | * | 8/1985 | Ishida ........................ 324/239 |
| 4,605,898 | A | * | 8/1986 | Aittoniemi et al. ......... 324/232 |
| 4,810,966 | A | * | 3/1989 | Schmall ..................... 324/236 |
| 5,047,719 | A | * | 9/1991 | Johnson et al. ............. 324/242 |
| 5,066,937 | A | * | 11/1991 | Moran ........................ 324/239 |
| 5,087,027 | A | * | 2/1992 | Acquaviva .................. 324/226 |
| 5,158,166 | A | * | 10/1992 | Barson ....................... 324/225 |
| 5,204,621 | A | * | 4/1993 | Hermann et al. ....... 324/207.18 |
| 5,397,986 | A | * | 3/1995 | Conway et al. ............. 324/243 |
| 5,905,810 | A | * | 5/1999 | Jones et al. ................. 382/135 |
| 6,479,990 | B1 | * | 11/2002 | Mednikov et al. .......... 324/225 |
| 6,853,183 | B1 | * | 2/2005 | Kindler ................. 324/207.17 |

FOREIGN PATENT DOCUMENTS

| DE | 38 37 239 A |   | 5/1989 |
| DE | 199 08 360 A |   | 5/2000 |
| GB | 2253057 A | * | 8/1992 |
| JP | 01 099195 A |   | 3/1998 |
| JP | 10214360 A | * | 8/1998 |
| JP | 10 197492 A |   | 10/1998 |
| WO | WO 99 24939 A |   | 5/1999 |

* cited by examiner

*Primary Examiner*—Uyen-Chau N. Le
(74) *Attorney, Agent, or Firm*—Michaud-Duffy Group LLP

(57) ABSTRACT

A device for accepting banknotes comprises a compartment for receiving a bundle of banknotes and a separating mechanism for extracting individual banknotes from the bundle. A sensor system for detecting metallic foreign bodies connected to the banknotes is arranged along at least one of the walls defining the compartment.

18 Claims, 3 Drawing Sheets

DEVICE FOR ACCEPTING BANKNOTES

CROSS-REFERENCE TO RELATED APPLICATIONS

This application is entitled to the benefit of and incorporates by reference essential subject matter disclosed in International Application No. PCT/EP02/00866 filed on Jan. 28, 2002 and German Patent Application No. 101 05 082.8 filed on Feb. 5, 2001.

FIELD OF THE INVENTION

The invention concerns an apparatus for accepting banknotes, especially an automatic money machine, with a compartment for receiving a banknote bundle and a separating mechanism for withdrawing individual banknotes from the bundle.

BACKGROUND OF THE INVENTION

The mechanical mechanisms inside an automatic money machine are highly developed complex components, which are carefully made and adjusted in order to be able to inspect individual banknotes with high clock frequency and to sort, count and transport them. These mechanisms react with corresponding sensitivity to foreign bodies, especially metal objects, such as office clips, stick pins, coins or the like. It must therefore be avoided that such foreign bodies do not move into the apparatus with the banknotes.

The invention has as its object the provision of a mechanism of the previously mentioned kind, which avoids a damaging of the mechanical components of the device by metallic foreign bodies.

This object is solved in accordance with the invention in that along at least one of the walls which bound the compartment a sensor arrangement is arranged for detecting metallic foreign bodies connected with the banknotes.

SUMMARY OF THE INVENTION

When the sensor arrangement discovers metallic objects at the inserted banknote bundles, the taking in of the banknotes is interrupted or is in deed not started. The customer can be required to again inspect the banknotes for foreign objects.

One possibility for non-contactingly detecting metal objects exists in that the sensor arrangement is formed as an eddy current sensor. One such eddy current sensor includes an oscillator, whose oscillations are damped and shifted in phase by the eddy currents induced in metal objects located in the vicinity of the sensor. These changes of the oscillation characteristic values can be evaluated as disturbance signals.

The employed eddy current sensor consists of a current carrying coil which is arranged on a metallic carrier sheet. With suitable design, by way of the inductive interaction of the two components the desired properties of the sensor are obtained. The effect of a flat elongated conductor on the magnetic field distribution of a current carrying coil located over the conductor is dependent on its electric and magnetic properties. From the mirroring method it is established that the field distribution of this arrangement is identical with that of the same coil and a mirroring coil on the boundary surface of the conductor. The arrangement of a coil at a spacing $\Delta$ above a flat conductor is replaced by the arrangement of two coils at a spacing $2\Delta$ with similar geometries, similar current amplitudes and a current phase which depends on the electric and magnetic properties of the flat conductor. In order that the boundary conditions which follow from the Maxwell equations are satisfied for the tangential component of the electric field strength at the boundary surface in the boundary case of an ideal conductor (conductivity $\sigma \to \infty$) the current direction must in the mirroring coil be oppositely directed to the direction in the original coil. The magnetic field linked with the current weaken at the same time. The entire field vanishes with decreasing spacing $\Delta \to 0$. In the boundary cases of an ideal magnetic conductor (magnetic permeability $\mu_r \to \infty$), the current direction in the mirroring coil must agree with that of the original coil so that the boundary conditions for the tangential component of the magnetic field strength at the boundary surface of the conductor are satisfied. The magnetic fields linked with the current increase in the forward direction. The entire field doubles with decreasing spacing $\Delta \to 0$ and dissolves in the rearward direction.

An arrangement suitable as a eddy current sensor of the illustrated kind requires therefore a mirroring material with high permeability and low conductivity. Sintered ferrites are good for use in this respect. However, these are mostly only available in cylinder or ring shapes and are seldom available in flat form. Moreover, they are brittle, slightly robust and mechanically poor to process. Mu-metals or weak magnetic ferrite steel offer a good compromise in respect to measuring sensitivity, workability, availability and costs. In this case, the reciprocal phase condition of the alternating current in the coil and its mirror image is not exactly filled. With suitable choice of the frequency of the coil current the relationship of the effect of conductivity and permeability is nevertheless clearly on the side of permeability so that a constructive overlapping of the two magnetic field components and therewith an amplification of the measuring sensitivity in the forward direction is achieved.

In an especially preferred embodiment, the sensor arrangement has at least one measuring coil and at least one compensation coil which is identical with the measuring coil in regard to its electric properties, which coils are arranged flatly in a spacing from one another on a metallic carrier plate bordering the compartment and which coils are connected with an oscillator as well as with an evaluation circuit. This arrangement is suited especially to the high sensitivity testing of flat objects such as banknotes. The measuring coil and the compensation coil should lie far enough from one another that they are not influenced in the same way by foreign objects such as office clips and the like, so that one can evaluate the presence of a metal object by way of a clear differential signal between the measuring coil and the compensation coil, which differential signal can be evaluated.

Preferably, the sensor arrangement has a plurality of measuring coils and compensation coils respectively associated with the measuring coils, which coils are arranged in distributed fashion over the carrier plate, with one measuring coil and an identical compensation coil being connected in sequence with the oscillator and the evaluation circle by means of a multiplexing circuit. Thereby, one achieves a large surface sensing arrangement which makes possible a monitoring of the entire compartment wall.

The carrier plate consists, at least on its outer side facing the coils, of a material of high permeability, for example a mu-metal or a weak magnetic ferrite steel. The carrier plate can consist entirely of this material. In so far as this may not be possible, it is however sufficient if on another metallic material a thin foil of the material of high permeability is applied.

The coils should be as flat as possible and are therefore advantageously each made as one layer of wire winding, or made by a lithographic etching technique and are for example adhesively attached to the carrier plate or are printed onto a foil which then is adhesively attached to the carrier plate.

The carrier plate with the coils is advantageously parallel to the outer surface of a banknote bundle lying in the compartment. For example, the carrier plate can itself be made from the banknote holdback plate, through which the drawing-off elements of the separating mechanism extend. The metallic carrier plate screens thereby the coil arrangement against electromagnetic disturbance signals from the interior of the device.

The arrangement can, however, also be so accomplished that the or a further carrier plate carrying the measuring and compensation coils is directed perpendicularly to the outer surface of the banknote bundle. If one has two nearly perpendicular to one another carrier plates the signals obtained from the coils on these carrier plates can be evaluated in common in order to increase the sensitivity of the sensor arrangement with respect to metal objects in the receiving compartment.

Advantageously, the clock speed of the sensor interrogation is coordinated with the withdrawing speed of the separating mechanism so that for each withdrawn banknote all of the coil pairs of the sensor arrangement are interrogated. In this way, it is assured that the entirety of the space detectable by the sensor arrangement is monitored.

In a further embodiment of the inventive solution, the eddy current sensor includes two arrangements of coils which are arranged on two walls which are parallel to one another of the compartment for the receiving of a banknote bundle, which walls border the compartment, with the coils of the one arrangement being switched as sending coils and with the coils of the other arrangement being switched as receiving coils. With this arrangement a high sensitivity of the eddy current sensor can be achieved so that also small metal parts such as, for example, paper clips in a note bundle can be detected.

The coils of each arrangement are preferably arranged next to one another over the entire width of the compartment so that the compartment can be monitored without gap.

In an especially preferred embodiment, the coils of a coil arrangement arranged on the one wall are arranged with respect to the coils of the coil arrangement on the other wall so as to be displaced by half a coil diameter. This obtains, for example, a receiving coil signal from two next to one another lying sender coils. Thereby, the width of the compartment is gaplessly monitored and it is avoided that a small metal object, which lies between two coils, can be missed, that is not detected. As has already been described above, the coils of the coil pairs are connected by way of a multiplexing circuit so as to be sequentially connected with a sending oscillator and a receiving and evaluation circuit, with a plurality of coils spaced from one another being simultaneously activated in order for the sensor arrangement to sensed with a high speed. This delivers the possibility, upon the insertion of the note bundle, that is during the movement of the same, to monitor the entire width of the compartment.

To avoid an influencing and disturbance of the sensor by metal parts of the device in which it is built the coils of both coil arrangements preferably are arranged on the side of a metallic carrier plate facing the compartment, which plate screens the coils against disturbances from the device.

BRIEF DESCRIPTION OF THE DRAWINGS

Further features and advantages of the invention will be apparent from the following description, which in combination with the accompanying drawings explain the invention by way of an exemplary embodiment. The drawings are.

DETAILED DESCRIPTION OF THE PREFERRED EMBODIMENTS

Figure 1:
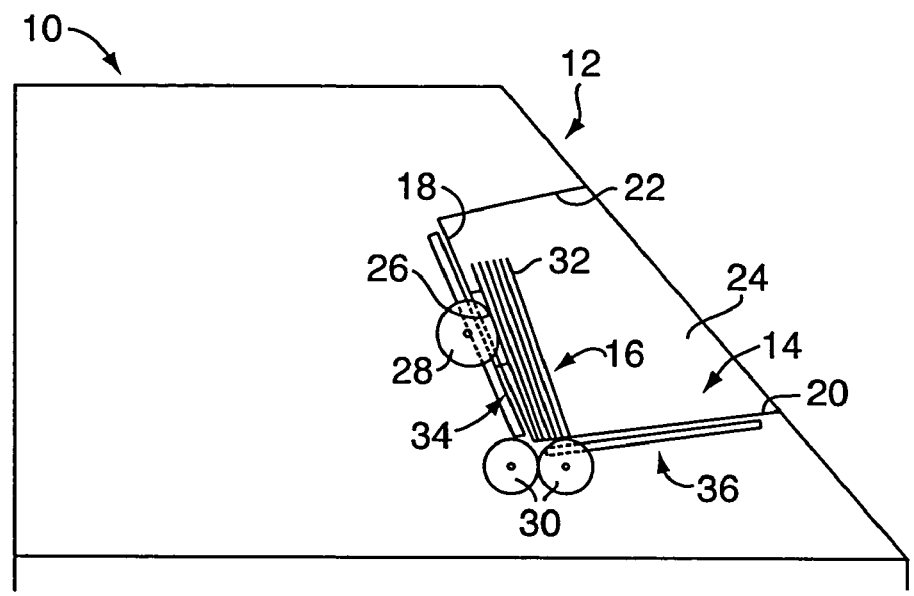
FIG. 1 a schematic side view of a banknote receiving compartment of an automatic money machine, FIG. 2 a schematic plan view of a carrier plate with a measuring coil and a compensation coil of the sensor arrangement according to the invention, FIG. 3 a principal circuit diagram of the sensor arrangement with oscillator and evaluation circuit, FIG. 4 a schematic partial section through the input compartment of a bank automatic machine, FIG. 5 a partial schematic plan view of a carrier plate with an assembly of coils, and FIG. 6 a schematic plan view of two coil assemblies displaced with respect to one another.

In FIG. 1, the reference numeral 10 indicates the housing of an automatic money machine which is designed for the accepting of banknotes. The automatic money machine can moreover be made in various known ways and need not be described here in more detail. Inside of the operating field 12 of the automatic money machine is formed a receiving compartment 14 for the insertion of a banknote bundle 16. The receiving compartment 14 has a rear wall 18, a bottom 20, a cover surface 22 and two side walls 24, of which only one is illustrated here. The banknote bundle 16 is so inserted that it stands on edge on the bottom 20 and lies flatly against the rear wall 18. The rear wall 18 has gaps 26 through which the draw-off rolls 28 extend, which in cooperation with separating rolls 30 of a separating mechanism individually draws off the individual banknotes 32 of the banknote bundle 16 and delivers them for processing in the automatic money machine.

Figure 2:
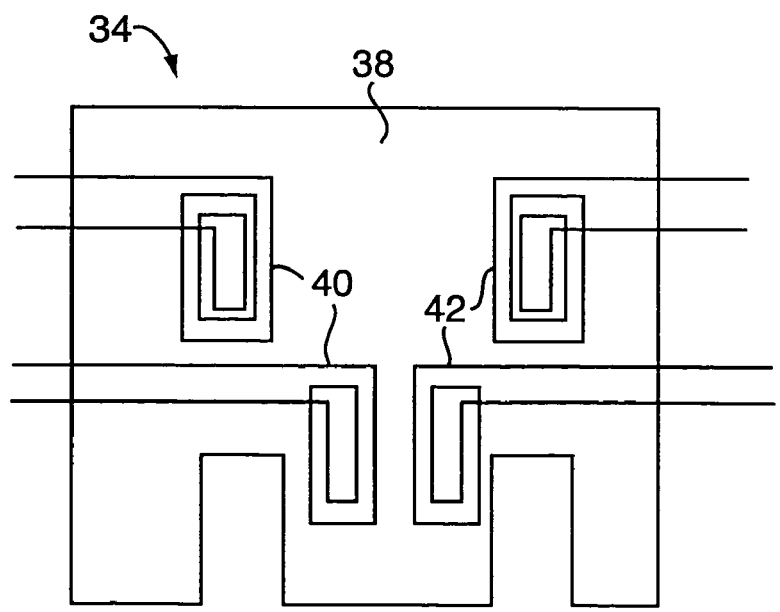

Practice has shown that office dips or stick pins are often found on the banknotes by means of which the banknotes are held to one another and which can lead to damage in the examination and processing mechanisms inside of the automatic money machine. Therefore, it must be avoided that these objects reach the interior of the automatic money machine. For this, flat sensor arrangements 34 and 36 are arranged respectively on the rear wall 18 and also on the bottom 20 parallel respectively to the rear wall 18 and to the bottom 20, which sensor arrangements will now be explained in more detail in connection with FIGS. 2 and 3.

A sensor arrangement includes a carrier plate 38 which consists of a metal of high permeability such as, for example, mu-metal or weakly magnetic ferrite steel or which is at least covered with a thin layer of such metal. For the sensitivity of the sensor arrangement a carrier plate of ferrite would be the best. However, this material in general is not processed in plate form or usable in devices such as an automatic money machine. On the carrier plate are at least two, preferably two pair wise similar, flat coils, so called pancake coils, which are arranged on the carrier plate upper surface in the form of single wire windings or as printed coils. The coils can, for example, be applied by adhesive or can be printed onto a foil which is then in turn fastened to the carrier plate. Each two coils which are spaced from one another should be formed identically. One of the coils forms a measuring coil while the other is designated as a compensation coil, with the measuring coil and the compensation coil being physically identical.

Figure 3:
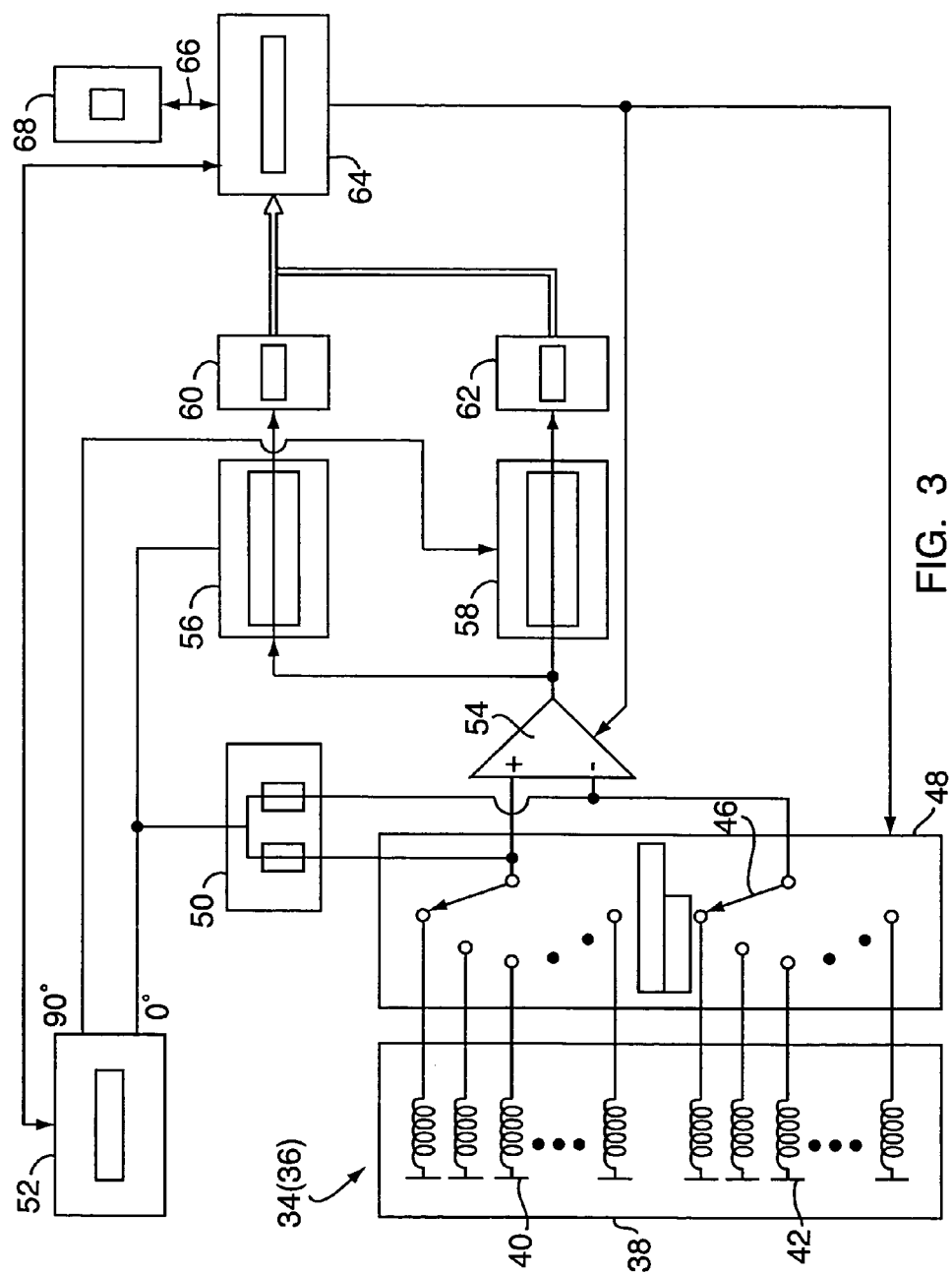

As is shown in FIG. 3, the group of measuring coils 40 is connected with a first switch 44 and the group of compensation coils 42 is connected with a second switch 46 of a multiplexer 48. By way of the switches 44 and 46, the measuring coils 40 and 42 can be connected pair wise with a current source 50 and an oscillator 52 as well as with the non-inverting and inverting inputs of a differential amplifier 54. The output of the differential amplifier 54 is connected with two rectifier circuits 56 and 58 for a phase selective rectification, to which further the oscillator signal and the 90° phase shifted oscillator signal are delivered. The outputs of the rectifier circuits 56 and 58 are connected with a microcontroller 64 respectively through an AD-Converter 60 or 62, which microcontroller in turn controls the differential amplifier 54 and on the other hand the multiplexer 48, and which microcontroller stands in connection with a PC 68 through an interface 66. Further, the microcontroller is connected with the oscillator 52 so that it can adjust its frequency.

If the sensor arrangement is activated by the coils 40, 42 the switches 44, 46 of the multiplexer 48 in sequence switch a single measuring coil 40 and a single compensation coil 42 to form an active coil pair. If a metallic object is located in the compartment, that is on the banknotes 32 of the banknote bundle 16, the amplitude and phase of the oscillations in the coils 40, 42 are changed by the eddy current induced in the metallic object. The measuring signal carries both amplitude and phase information which by means of phase selection can be used to distinguish the signal contributions of the different metallic parts (ground, material) from those which arise from temperature influences on the sensor arrangement and on the investigation electronics.

Electromagnetic disturbance coupling into the sensor arrangement as a result of electric switching processes inside of the automatic money machine can be suppressed by small band filtering of the eddy current signal and by the differential switching of the coils 40 and 42.

If the evaluation of the difference signals appearing in the coils 40 and 42 indicates that a metal object is located in the receiving compartment, the running intake is interrupted or the intake is not begun at all. The customer is then advised that he should again remove the banknotes and inspect them for the presence of metallic parts.

The sensitivity of the sensor arrangement can be further increased in that along with the sensor arrangement 34 on the rear wall 18, a sensor arrangement 36 on the bottom 20 of the receiving compartment is also provided. The signals of a sensor arrangement 36 can themselves be evaluated or can be compared with the signals of the sensor arrangement 34 in order to provide a further criteria for the presence of metallic objects in the receiving compartment 14.

The clock speed at which the multiplexer 48 senses the measuring and compensation coils is advantageously suited to the intake speed of the banknotes 32 so that it is assured that each banknote is interrogated by the entire sensing arrangement.

Figure 4:
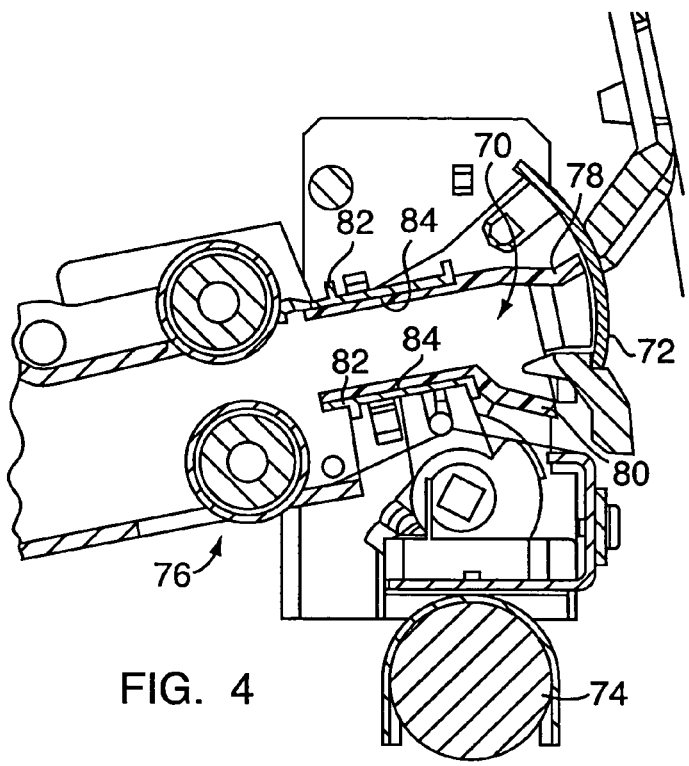

In FIG. 4 is seen the input compartment, indicated generally at 70, of an automatic bank machine which is designed for the receiving of bundles of banknotes, check forms or the like. The compartment 70 is closed on its input side by an arcuately curved flap 72 which can be moved by means of a motor 74 between the illustrated closed position and an open position, in which the compartment 70 is made free. Adjacent the side opposite the flap 72 is an intake and transport mechanism 76, which will not be explained here in more detail and which delivers the inserted note bundle to further processing.

Figure 5:
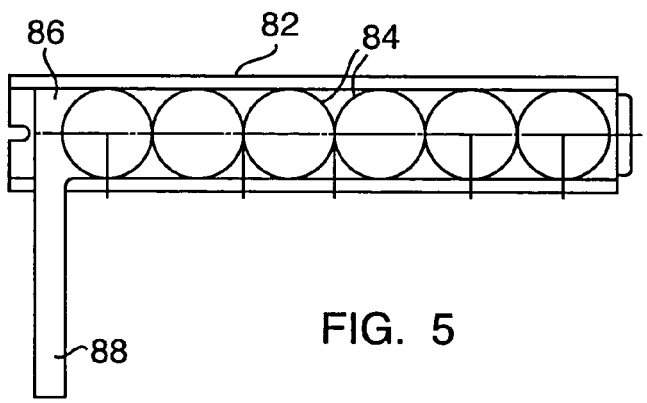
Figure 6:
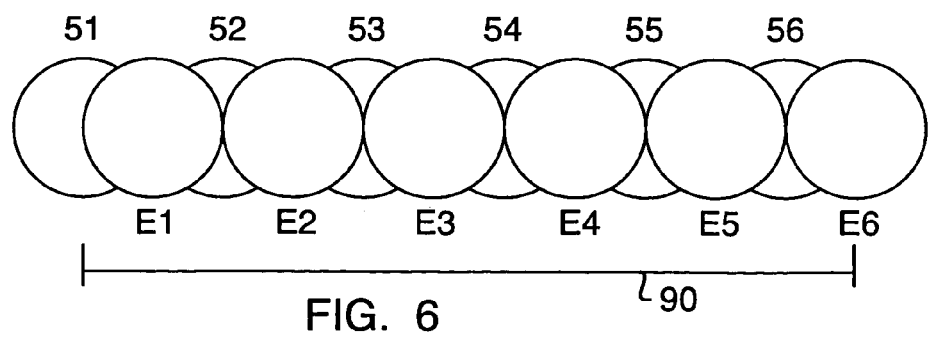

The input chute or input compartment 70 is bounded by two walls 78 and 80 of plastic material, which in the vicinity of the flap 72 define a funnel shaped insertion region and which thereafter are arranged parallel to one another. On each of these parallel sections of the walls 78 and 80 which face away from one another is arranged a metallic carrier plate 82 which on its side facing the compartment 70 carries an arrangement of coils 84, as is illustrated in FIG. 5. The coils 84 of each coil arrangement are adhesively attached to a carrier foil 86 which has a projection 88 over which the non-illustrated connecting conductors for the individual coils 84 run. The arrangement of the coils 84 of the two coil arrangements in the viewing direction of the observer in FIG. 4 are displaced from one another by a half coil diameter, as is schematically shown in FIG. 6 wherein the line 90 illustrates the width of the compartment 70 in the viewing direction of the observer of FIG. 4.

An emitted oscillating signal from the coils S1 to S6 is disturbed in respect to amplitude and phase by metal objects inserted into the compartment 70 so that by the change of the signals of the associated receiving coils E1 to E6 the presence of a metallic object in the compartment can be recognized. For this, the coils S1 to S6 and E1 to E6 by means of a multiplexer switch are sequentially connected with a sending oscillator and a receiving and evaluation circuit. With the arrangement according to FIG. 6 the receiving coil E1 is combined both with the sending coil S1 and the sending coil S2. The receiving coil E2 is combined with the sending coil S2 and the sending coil S3, and so forth. By this overlapping interrogation a gapless monitoring of the compartment width is possible. Further, to save time, simultaneously for example, the sending-receiving pairs S1, E1 and S4, E4, the sending-receiving pairs S2, E2 and S5, E5 and so forth can be interrogated so that the width of the compartment 70 can also be monitored if the bundle is relatively rapidly moved through the compartment 70.

It has been shown that the sensitivity of this arrangement is so large that, for example, it can be distinguished whether a disturbance arises from a paper clip or from the magnetic ink of a check form. In this way, it can be reliably avoided that metallic parts reach the apparatus and damage or disturb the separating mechanism used for separating the banknotes or check forms.

The invention claimed is:

1. An apparatus for accepting banknotes and check forms, especially for automatic money machines, with a compartment for receiving a banknote bundle and a separating mechanism for withdrawing individual banknotes from the bundle, with a sensor arrangement for detecting metallic foreign bodies connected with the banknotes arranged along at least one of the boundary walls of the compartment and formed as an eddy current sensor, characterized in that the sensor arrangement has a coil pair including a measuring coil and a compensation coil which with respect to the compensation coil electric properties is identical with the measuring coil, which coils in a spacing from one another are arranged flatly on a metallic carrier plate bordering the compartment and which coils are connected with a current source, an oscillator as well as with a differential amplifier.

2. An apparatus according to claim 1, wherein the sensor arrangement has a plurality of coil pairs comprising a measuring coil and an associated compensation coil, which coils are arranged in a distributed fashion over the carrier plate, with each measuring coil and a compensation coil identical to one another being connected by a multiplexing circuit sequentially with the oscillator and with the differential amplifier.

3. A device according to claim 2, wherein the eddy current sensor includes two arrangements of coils which are arranged on two walls parallel to one another of the compartment for receiving the banknote bundle between them, with the coils of the one arrangement being switched as sending coils and the coils of the other arrangements being switched as receiving coils.

4. An apparatus according to claim 3, wherein the coils of each arrangement are arranged next to one another over the entire width of the compartment.

5. A device according to claim 3, wherein the coils of a coil arrangement arranged on one wall are arranged with respect to the coils of the coil arrangement on the other wall so as to be displaced from one another by a half of the coil diameter.

6. A device according to claim 3, wherein the coils of the coil arrangements are connectable through a multiplexer circuit sequentially with a sending oscillator and a receiving and evaluation circuit.

7. A device according to claim 6, wherein a plurality of coils spaced from one another are simultaneously activated.

8. A device according to claim 3, wherein the coils of both coil arrangements are arranged on the side of a metallic carrier plate facing the compartment.

9. A device according to claim 1, wherein the carrier plate is parallel to an outer surface of the banknote bundle lying in the compartment.

10. A device according to claim 9, wherein the carrier plate is formed by a banknote holdback plate through which the drawing-off elements of the separating mechanism extend.

11. A device according to claim 1, wherein the carrier plate or another carrier plate with measuring and compensation coils is arranged perpendicularly to an outer surface of the banknote bundle.

12. A device according to claim 1, wherein the carrier plate at least on its outer surface facing the coils is made of a material of high permeability.

13. A device according to claim 12, wherein the material of high permeability is a mu-metal.

14. A device according to claim 12, wherein the material of high permeability is a weak magnetic ferrite steel.

15. A device according to claim 1, wherein the coils are made in one layer as wire windings or by a lithographic etching technique.

16. A device according to claim 1, wherein the coils are adhesively attached to a foil, which foil is adhesively attached to the carrier plate.

17. A device according to claim 1, wherein the coils are adhesively attached to the carrier plate.

18. A device according to claim 1, wherein a clock speed of the sensor interrogation is coordinated with the draw-off speed of the separating mechanism.

* * * * *